(12) United States Patent
McClurg et al.

(10) Patent No.: US 6,993,165 B2
(45) Date of Patent: Jan. 31, 2006

(54) SYSTEM HAVING A ROTATING OPTICAL SYSTEM AND A NON-PLANAR PRISM THAT ARE USED TO OBTAIN PRINT AND OTHER HAND CHARACTERISTIC INFORMATION

(75) Inventors: George W. McClurg, Jensen Beach, FL (US); John F. Carver, Palm City, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 10/725,543

(22) Filed: Dec. 3, 2003

(65) Prior Publication Data

US 2004/0161136 A1  Aug. 19, 2004

Related U.S. Application Data

(60) Provisional application No. 60/431,240, filed on Dec. 6, 2002, and provisional application No. 60/491,537, filed on Aug. 1, 2003.

(51) Int. Cl.
*G06K 9/00* (2006.01)

(52) U.S. Cl. .......................... 382/124; 353/81; 356/127; 359/438; 359/831

(58) Field of Classification Search ................. 382/115, 382/124; 353/33, 81; 356/19, 127, 134–137, 356/239.2, 467, 514, 71, 73; 359/211, 431, 359/438, 496, 606, 625, 638, 640, 669, 678, 359/720, 831, 835, 209, 220, 221, 709, 834, 359/196
See application file for complete search history.

(56) References Cited

U.S. PATENT DOCUMENTS

| 2,146,662 A | 2/1939 | Van |
| 2,184,858 A | 12/1939 | Goodman |
| 3,054,854 A | 9/1962 | Neasham |
| 3,282,152 A | 11/1966 | Myer |
| 3,333,502 A | 8/1967 | Flanagan |
| 3,511,571 A | 5/1970 | Ogle |
| 3,648,240 A | 3/1972 | Jacoby et al. |
| 3,716,301 A | 2/1973 | Caulfield et al. |
| 3,765,018 A | 10/1973 | Heard et al. |
| 3,804,524 A | 4/1974 | Jocoy et al. |
| 3,806,706 A * | 4/1974 | Hasslinger et al. .... 235/462.28 |

(Continued)

FOREIGN PATENT DOCUMENTS

| JP | 3-161884 | 7/1991 |
| WO | WO 96/17480 A3 | 6/1996 |
| WO | WO 96/17480 A2 | 6/1996 |

OTHER PUBLICATIONS

International Search Report from PCT Appl. No. PCT/US03/38536, filed Dec. 4, 2003, 4 pages.

International Search Report from PCT Appl. No. PCT/US03/38644, filed Dec. 5, 2003, 3 pages.

English Abstract for Japanese Patent Publication No. 3-161884, published Jul. 7, 1991, 1 page, from http://v3.espacenet.com/.

*Primary Examiner*—Kanjibhai Patel
*Assistant Examiner*—Abolfazl Tabatabai
(74) *Attorney, Agent, or Firm*—Sterne, Kessler, Goldstein & Fox P.L.L.C.

(57) ABSTRACT

A rotating optical system includes an optical element and a measuring device for locating and/or scanning a full palm print and/or full palm and fingerprint for a hand positioned on a non-planar surface of an optical element. The hand is placed on the non-planar surface of the optical element. A measuring device can be rotated about a centerline axis of the optical element. During the rotation, a circular image of the full palm print (including thenar, hypothenar, interdigital, palm heel, "writers palm," palm pocket, and fingertips) and/or full palm and finger prints, and/or hand characteristic information (e.g., hand geometry, spacing, etc.) can be captured by the measuring portion.

14 Claims, 19 Drawing Sheets

U.S. PATENT DOCUMENTS

| | | | |
|---|---|---|---|
| 3,882,462 A | | 5/1975 | McMahon |
| 4,032,889 A | | 6/1977 | Nassimbene |
| 4,128,837 A | | 12/1978 | Page |
| 4,180,306 A | | 12/1979 | Duhrkoop et al. |
| 4,206,441 A | | 6/1980 | Kondo |
| 4,206,556 A | | 6/1980 | Sabo et al. |
| 4,215,274 A | | 7/1980 | Segall |
| 4,357,597 A | | 11/1982 | Butler |
| 4,387,365 A | | 6/1983 | Berry et al. |
| 4,414,684 A | | 11/1983 | Blonder |
| 4,420,261 A | * | 12/1983 | Barlow et al. ............... 356/621 |
| 4,461,576 A | * | 7/1984 | King ........................... 356/623 |
| 4,467,545 A | | 8/1984 | Shaw, Jr. |
| 4,578,793 A | | 3/1986 | Kanee et al. |
| 4,611,881 A | * | 9/1986 | Schmidt et al. ............. 359/220 |
| 4,637,718 A | * | 1/1987 | Kirchner et al. ............. 356/71 |
| 4,688,092 A | | 8/1987 | Kamel et al. |
| 4,701,960 A | | 10/1987 | Scott |
| 4,720,869 A | | 1/1988 | Wadia |
| 4,736,203 A | | 4/1988 | Sidlauskas |
| 4,736,436 A | | 4/1988 | Yasukawa et al. |
| 4,751,660 A | | 6/1988 | Hedley |
| 4,751,759 A | | 6/1988 | Zoell |
| 4,774,516 A | | 9/1988 | Henri et al. |
| 4,790,025 A | | 12/1988 | Inoue et al. |
| 4,805,117 A | | 2/1989 | Fiore et al. |
| 4,821,118 A | | 4/1989 | Lafreniere |
| 4,925,300 A | | 5/1990 | Rachlin |
| 5,140,469 A | | 8/1992 | Lamarre et al. |
| 5,225,924 A | | 7/1993 | Ogawa et al. |
| 5,249,370 A | | 10/1993 | Stanger et al. |
| 5,307,264 A | | 4/1994 | Waggener et al. |
| 5,309,274 A | * | 5/1994 | Akanabe ..................... 359/209 |
| 5,313,306 A | | 5/1994 | Kuban et al. |
| 5,367,399 A | | 11/1994 | Kramer |
| 5,377,002 A | | 12/1994 | Malin et al. |
| 5,440,428 A | | 8/1995 | Hegg et al. |
| 5,452,135 A | * | 9/1995 | Maki et al. ................. 359/834 |
| 5,469,289 A | | 11/1995 | Iwao et al. |
| 5,526,436 A | | 6/1996 | Sekiya |
| 5,528,355 A | * | 6/1996 | Maase et al. ................. 356/71 |
| 5,588,097 A | | 12/1996 | Ono et al. |
| 5,610,751 A | | 3/1997 | Sweeney et al. |
| 5,638,461 A | | 6/1997 | Fridge |
| 5,650,842 A | | 7/1997 | Maase et al. |
| 5,677,763 A | * | 10/1997 | Redmond ..................... 356/73 |
| 5,677,782 A | | 10/1997 | Peng |
| 5,699,186 A | | 12/1997 | Richard |
| 5,777,751 A | | 7/1998 | Ward |
| 5,796,426 A | | 8/1998 | Gullichsen et al. |
| 5,798,923 A | | 8/1998 | Laskowski |
| 5,937,102 A | | 8/1999 | Jin |
| 6,021,007 A | | 2/2000 | Murtha |
| 6,038,332 A | | 3/2000 | Fishbine et al. |
| 6,041,134 A | | 3/2000 | Merjanian |
| 6,046,867 A | | 4/2000 | Rana |
| 6,175,407 B1 | | 1/2001 | Sartor |
| 6,198,429 B1 | | 3/2001 | Fujikawa et al. |
| 6,243,488 B1 | | 6/2001 | Penna |
| 6,341,028 B1 | | 1/2002 | Bahuguna et al. |
| 6,373,969 B1 | | 4/2002 | Adler |
| 6,394,356 B1 | | 5/2002 | Zagami |
| 6,411,441 B1 | | 6/2002 | Videen |
| 6,415,064 B1 | | 7/2002 | Oh |
| 6,424,470 B1 | | 7/2002 | Lindner |
| 6,459,451 B2 | | 10/2002 | Driscoll, Jr. et al. |
| 6,466,686 B2 | | 10/2002 | Senior |
| 6,496,608 B1 | | 12/2002 | Chui |
| 6,616,065 B2 | | 9/2003 | Martin |
| 2002/0049714 A1 | | 4/2002 | Yamazaki et al. |
| 2002/0141620 A1 | | 10/2002 | Monden |
| 2003/0012417 A1 | | 1/2003 | Hamid |
| 2003/0099022 A1 | | 5/2003 | Karin et al. |
| 2004/0109245 A1 | | 6/2004 | McClurg et al. |
| 2004/0109589 A1 | | 6/2004 | McClurg et al. |
| 2004/0109591 A1 | | 6/2004 | McClurg et al. |
| 2004/0114785 A1 | | 6/2004 | McClurg et al. |
| 2004/0114786 A1 | | 6/2004 | Cannon et al. |

* cited by examiner

SYSTEM HAVING A ROTATING OPTICAL SYSTEM AND A NON-PLANAR PRISM THAT ARE USED TO OBTAIN PRINT AND OTHER HAND CHARACTERISTIC INFORMATION

CROSS REFERENCE TO RELATED APPLICATIONS

This application claims the benefit of U.S. Provisional Application No. 60/431,240, filed Dec. 6, 2002, and U.S. Provisional Application No. 60/491,537, filed Aug. 1, 2003, both of which are incorporated herein by reference in their entireties.

BACKGROUND OF THE INVENTION

1. Field of the Invention

The present invention pertains to biometric imaging technology, and in particular, to live scanning of prints.

2. Background Art

Biometrics is a science involving the analysis of biological characteristics. Biometric imaging captures a measurable characteristic of a human being for identity and other related purposes. Print capture and recognition is an important biometric technology. Law enforcement, banking, voting, and other industries increasingly rely upon prints as a biometric to store, recognize or verify identity. Generally, a biometric is a measurable, physical characteristic or personal behavior trait used to recognize the identity, or verify the claimed identity, of a person who has a biometric reference template (e.g., data that represents a biometric measurement) on file.

Biometric imaging systems may include, but are not limited to, print imaging systems. Print imaging systems can capture images of prints on thumbs, fingers, palms, toes, feet, and/or hands. Such print imaging systems are also referred to as scanners or live scanners. Conventional live scanners use light to detect an image of a fingerprint and/or palm print. For example, one or more fingers or a palm are placed on a platen. An illumination source illuminates the underside of the platen. An image representative of valleys, ridges, or other characteristics of a fingerprint or a palm print is then detected by an image sensor, such as a solid-state camera.

One problem with conventional palm live scanner systems is that a palm naturally curves, while a typical platen has a flat planar surface upon which a palm is placed. Thus, there is a chance that not all portions of the palm print will be imaged during scanning. If this occurs, biometric information can be lost.

Also, in many live scanners, increasing the surface area of a flat platen requires a significant increase in the size of a camera being used to detect images on the platen. Large area cameras or sets of cameras can dramatically increase cost and complexity. As a result, the size of the surface area of a flat platen is limited in many live scanners to a size of an average palm or smaller.

Therefore, what is needed is a scanning optical device configured to scan light from platen surface area onto a detection device that is substantially smaller than a platen surface area.

BRIEF SUMMARY OF THE INVENTION

Embodiments of the present invention provide a scanning optical device used in a system configured to capture image data representing biometric data. The scanning optical device includes an optical device, device for rotating, and a detection device. The optical device directs light that has totally internally reflected from an inside surface of a non-planar prism in the system onto the detection device. The rotating device rotates at least one of the optical device and the detecting device while the light is being detected.

In one aspect of the present invention, the rotating device can be a motor, belt, and pulley system. In another aspect of the present invention, the rotating device can be a prism, such as a Dove or Pachan prism.

Using the rotating device allows a detection device having a smaller surface area than the inside surface of the non-planar prism to detect all light totally internally reflecting from the inside surface of the non-planar prism. Also, through the use of the curved surface of the non-planar prism, which is shaped to better conform to a palm of a user's hand, and the rotating device the system can complete hand and palm prints, writer's palm prints, writer's palm prints in combination with fingerprints, and other prints for one or two hands, as is discussed in detail below.

Further embodiments, features, and advantages of the present inventions, as well as the structure and operation of the various embodiments of the present invention, are described in detail below with reference to the accompanying drawings.

BRIEF DESCRIPTION OF THE DRAWINGS/ FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
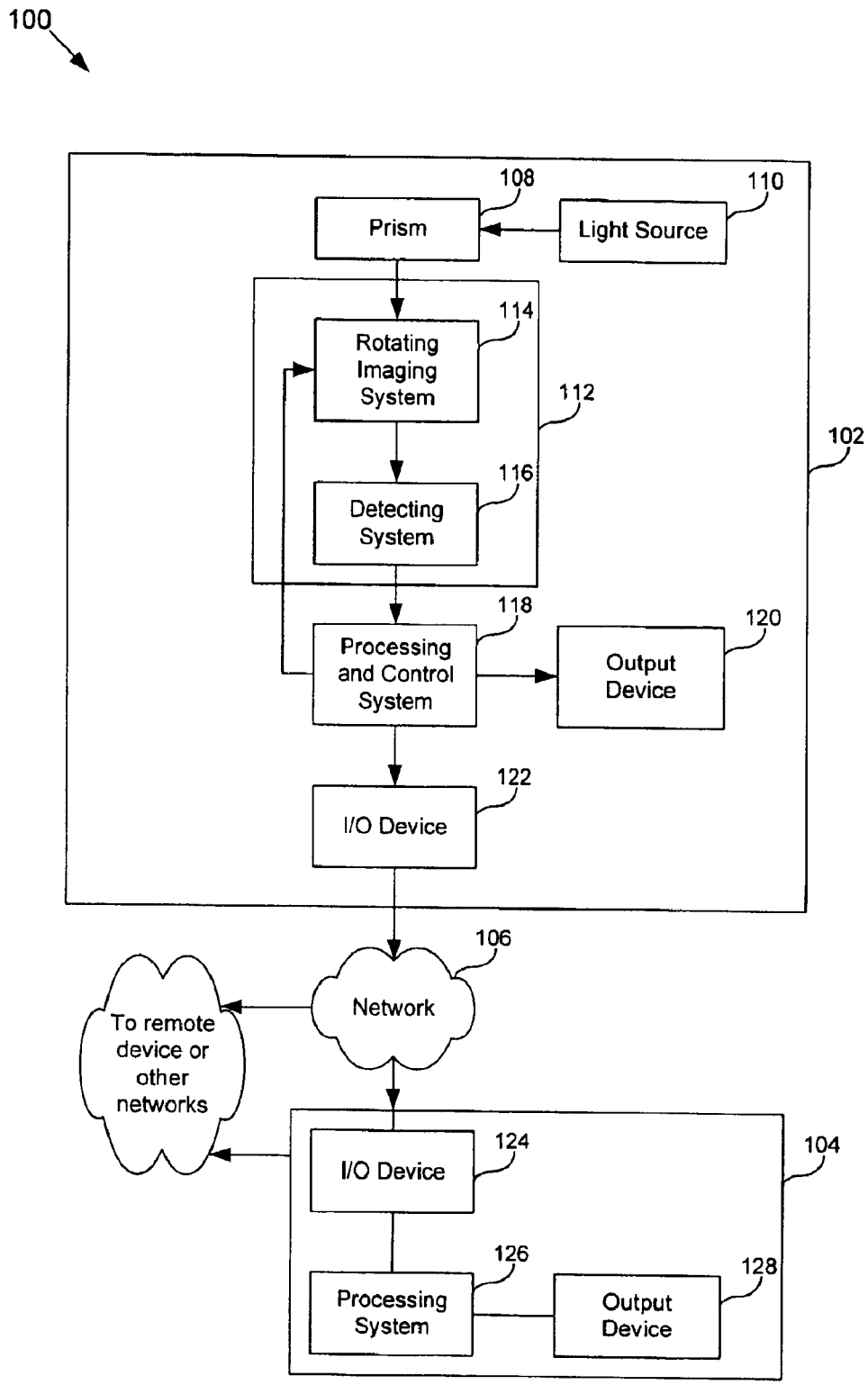
FIG. 1 shows a system for capturing biometric data according to an embodiment of the present invention.
Figure 2:
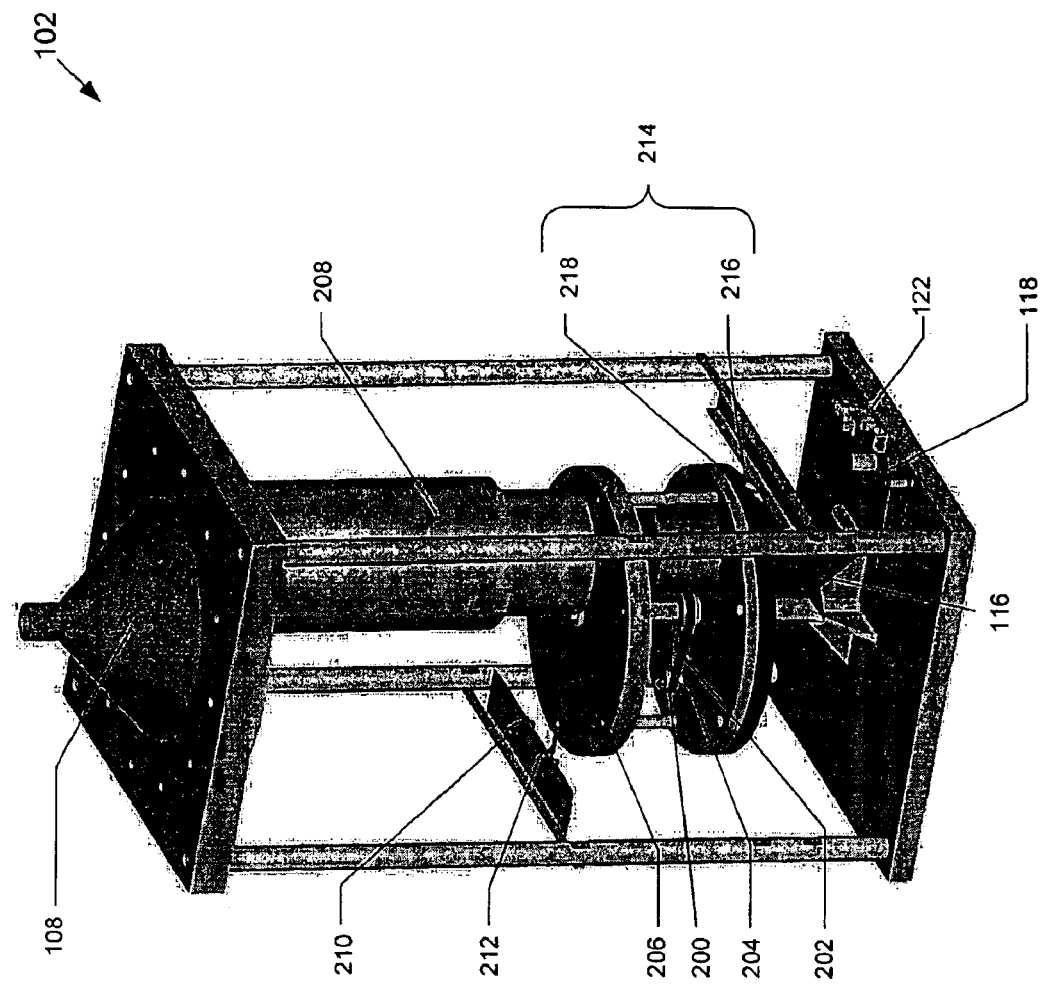
FIG. 2 shows a local section of the system in FIG. 1 according to an embodiment of the present invention.

FIGS. 4, 5, 6, and 7 show an encoder section of the system in FIGS. 1 and 2 according to various embodiments of the present invention.

Figure 8:
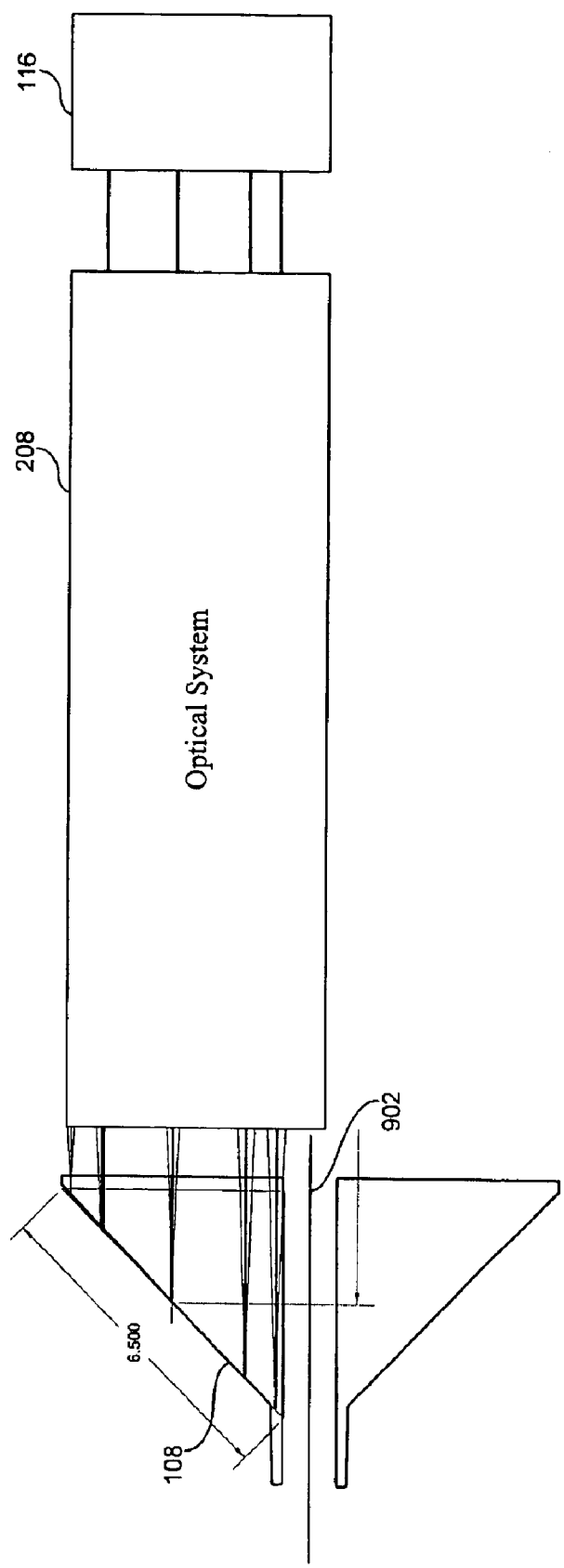

FIG. 8 shows a prism and optical system in the system of FIGS. 1 and 2 according to an embodiment of the present invention.

Figure 9:
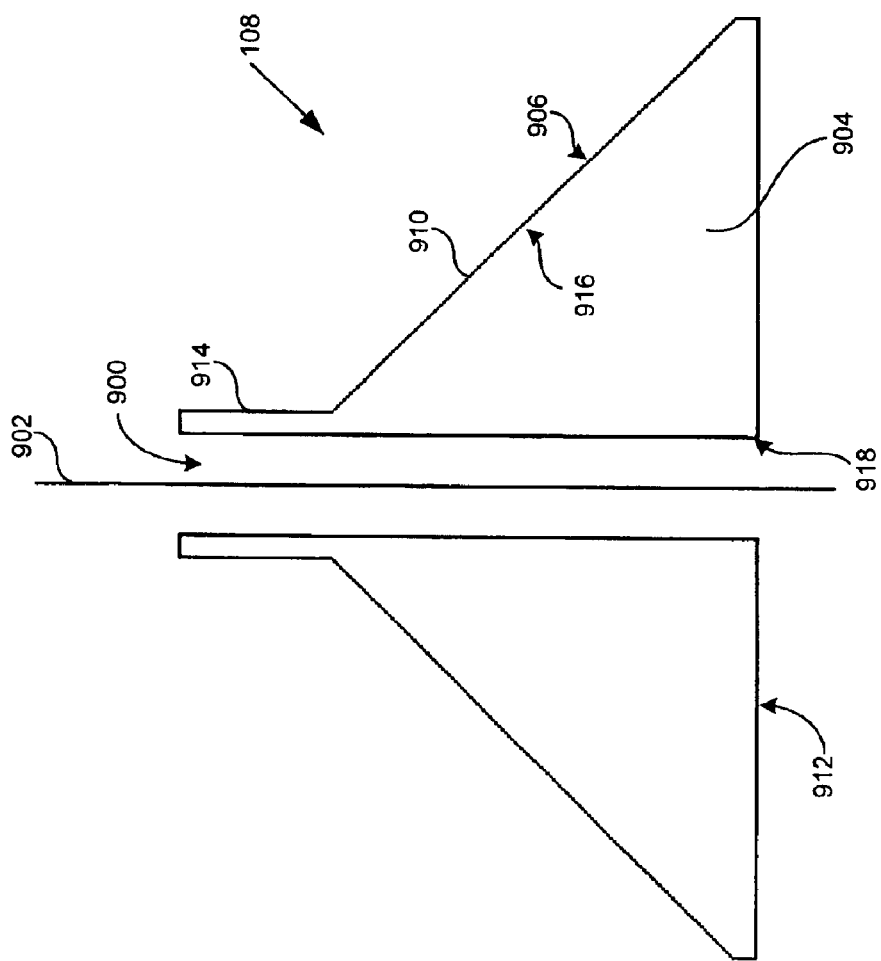

FIG. 9 shows a prism according to an embodiment of the present invention.

Figure 10:
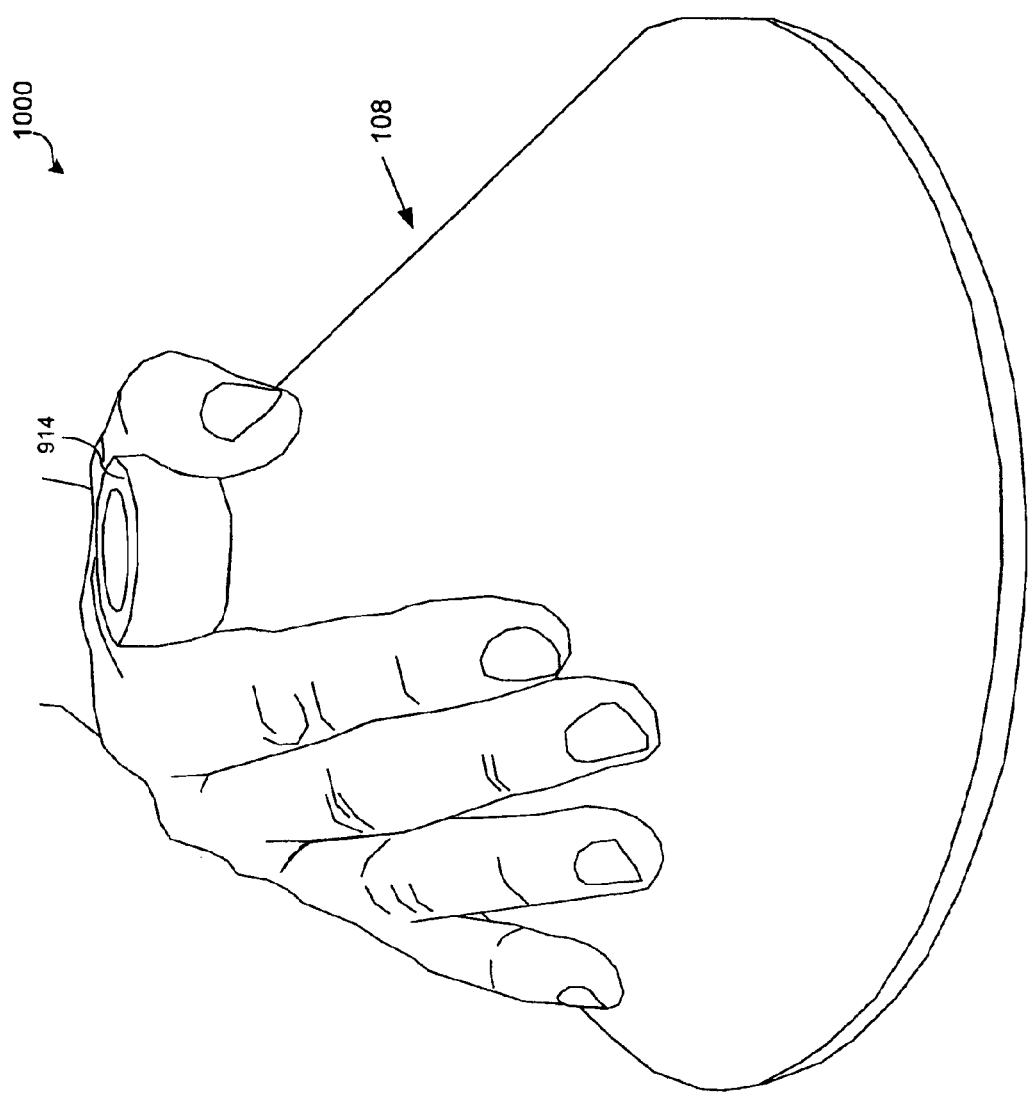
Figure 11:
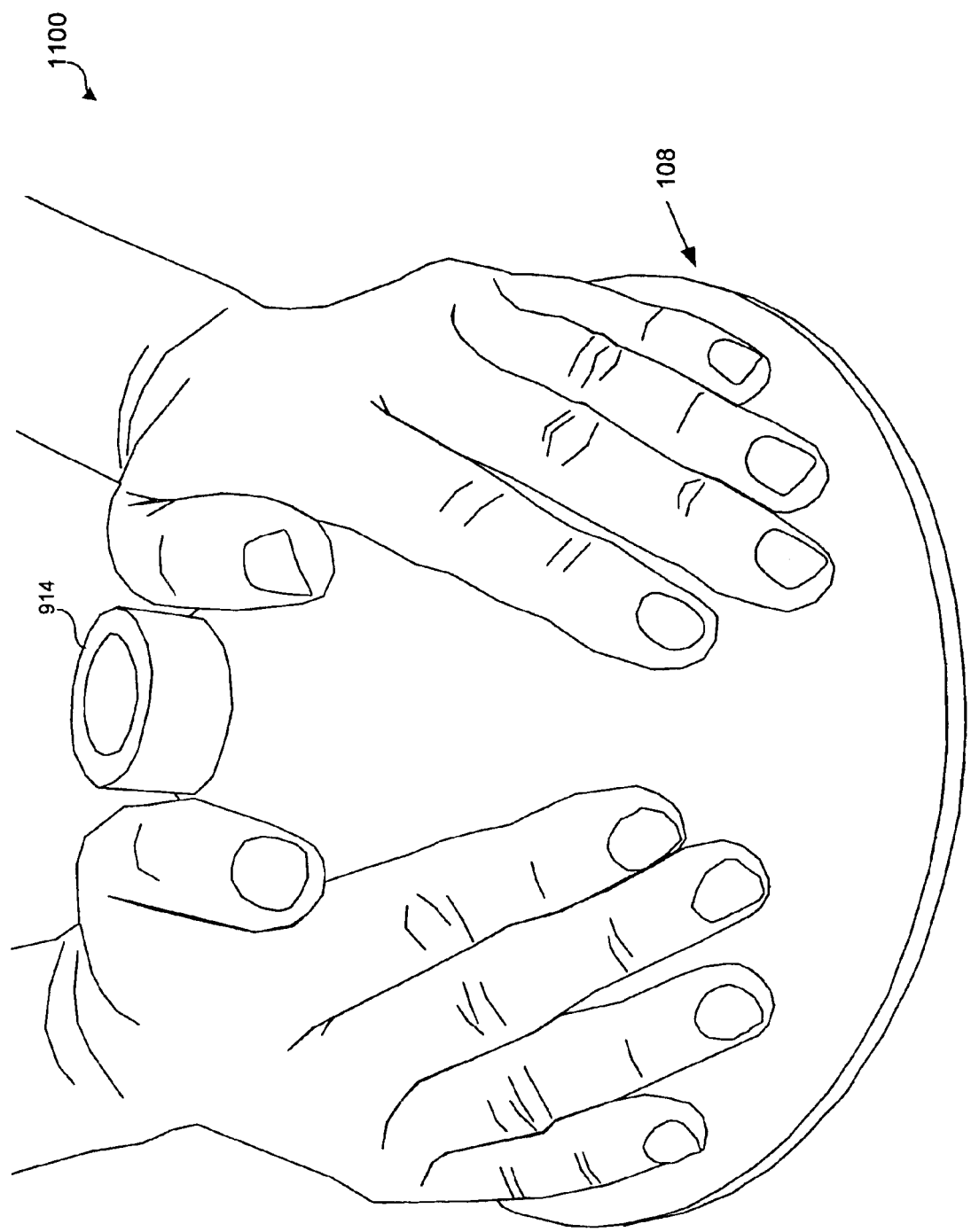

FIGS. 10–11 illustrate how a subject places one or both hands, respectively, on a prism according to various embodiments of the present invention.

Figure 12:
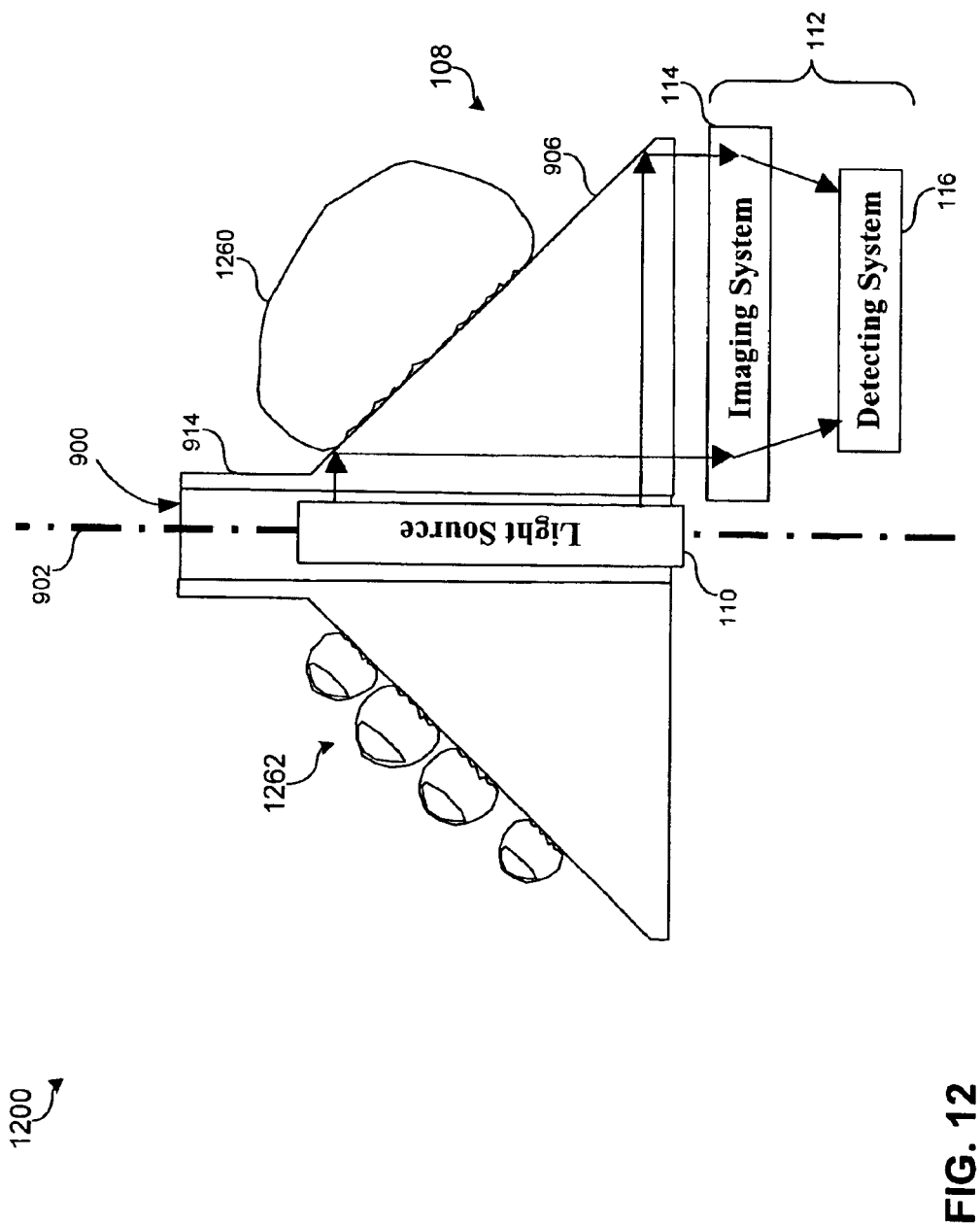
Figure 13:
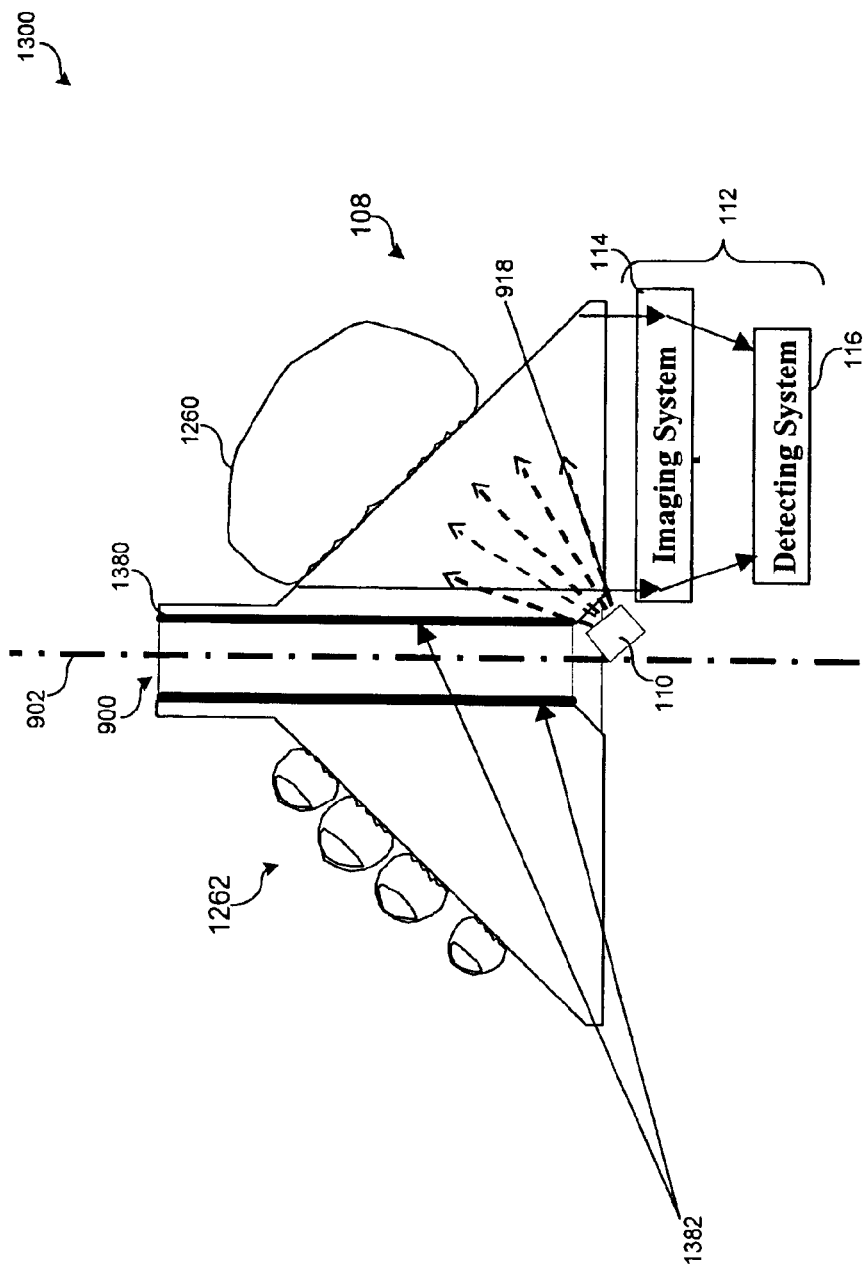
Figure 14:
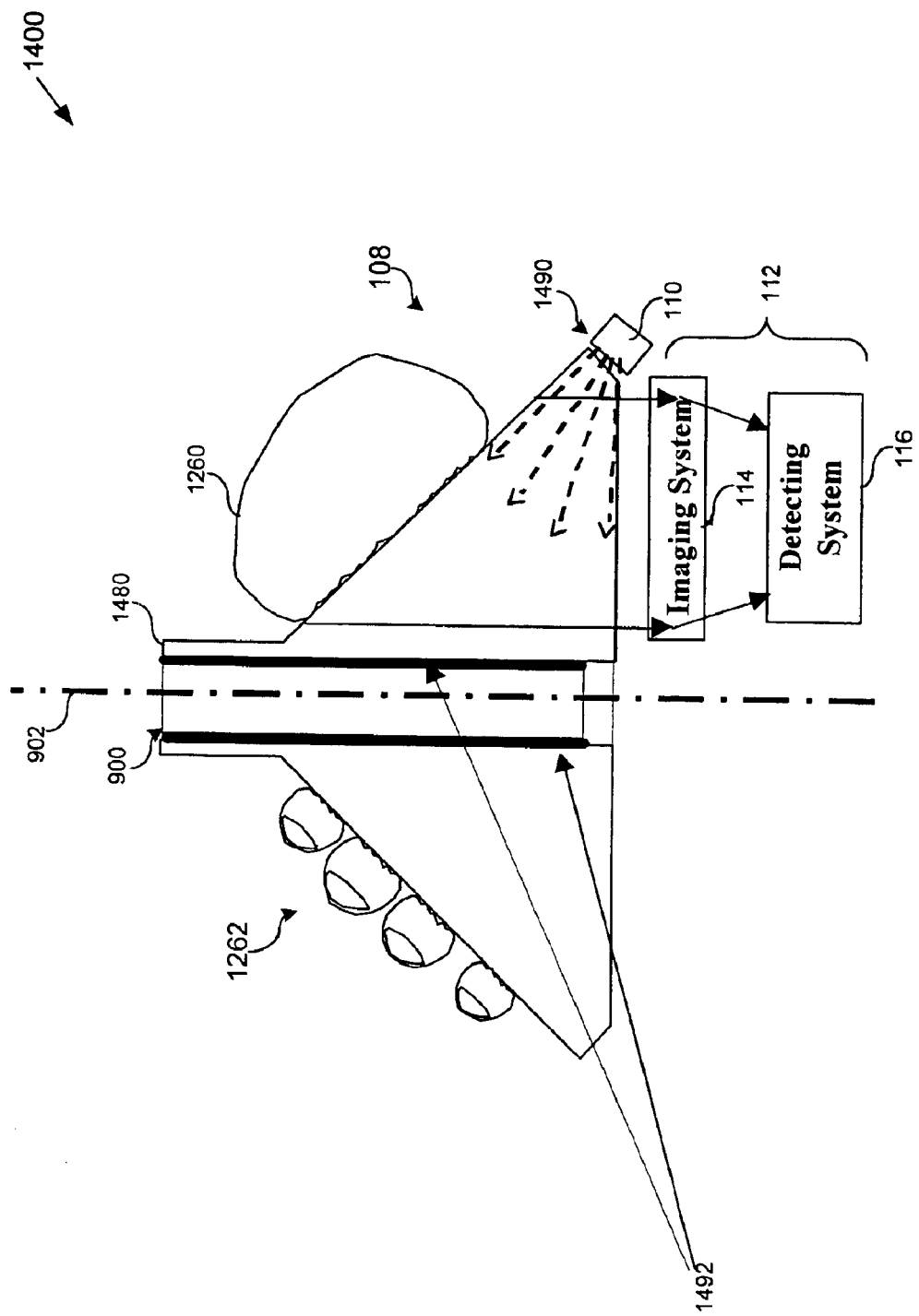

FIGS. 12–14 show various light source positions for illuminating a prism according to various embodiments of the present invention.

Figure 15:
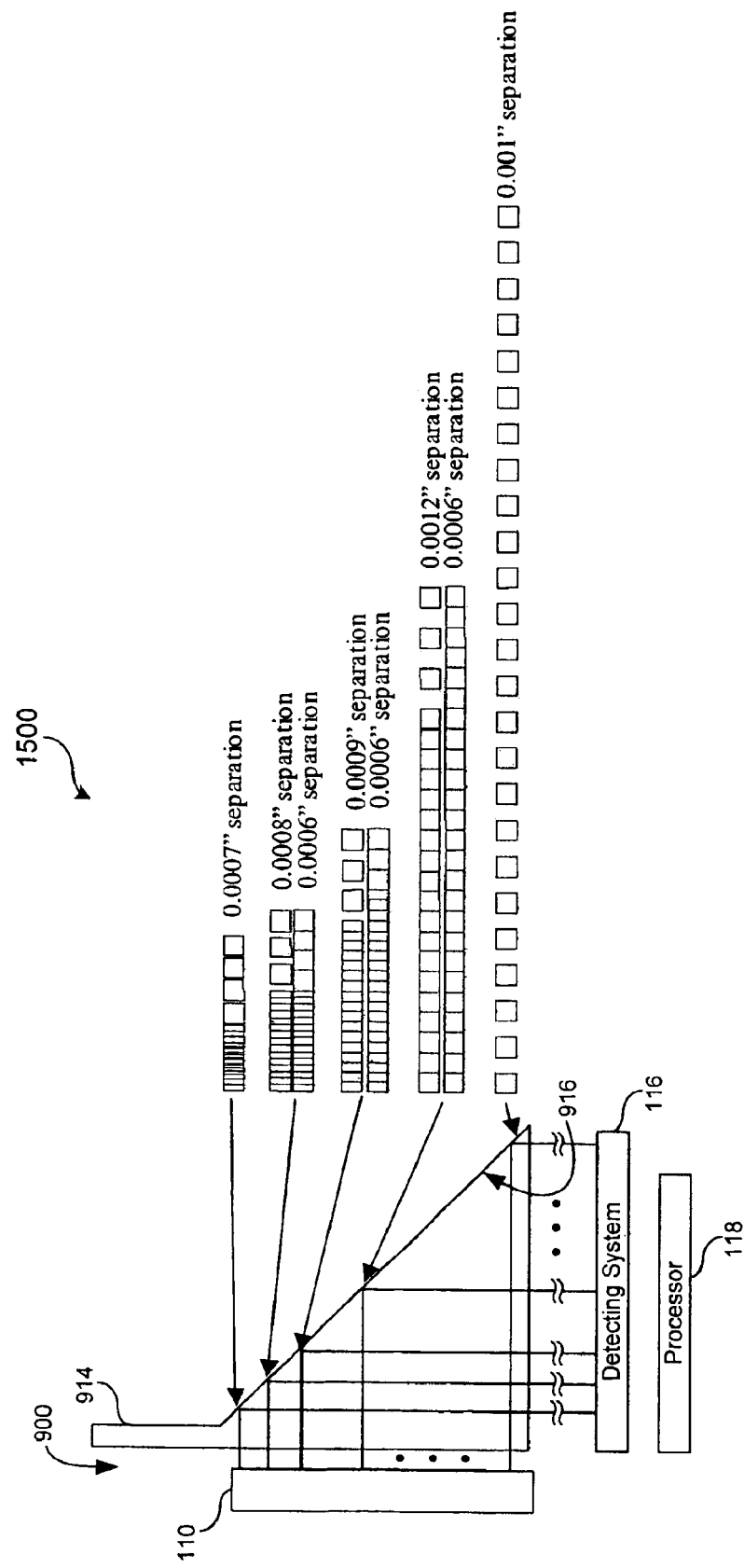

FIG. 15 shows image pixel layout for different sections of a non-planar prism according to an embodiment of the present invention.

Figure 16:
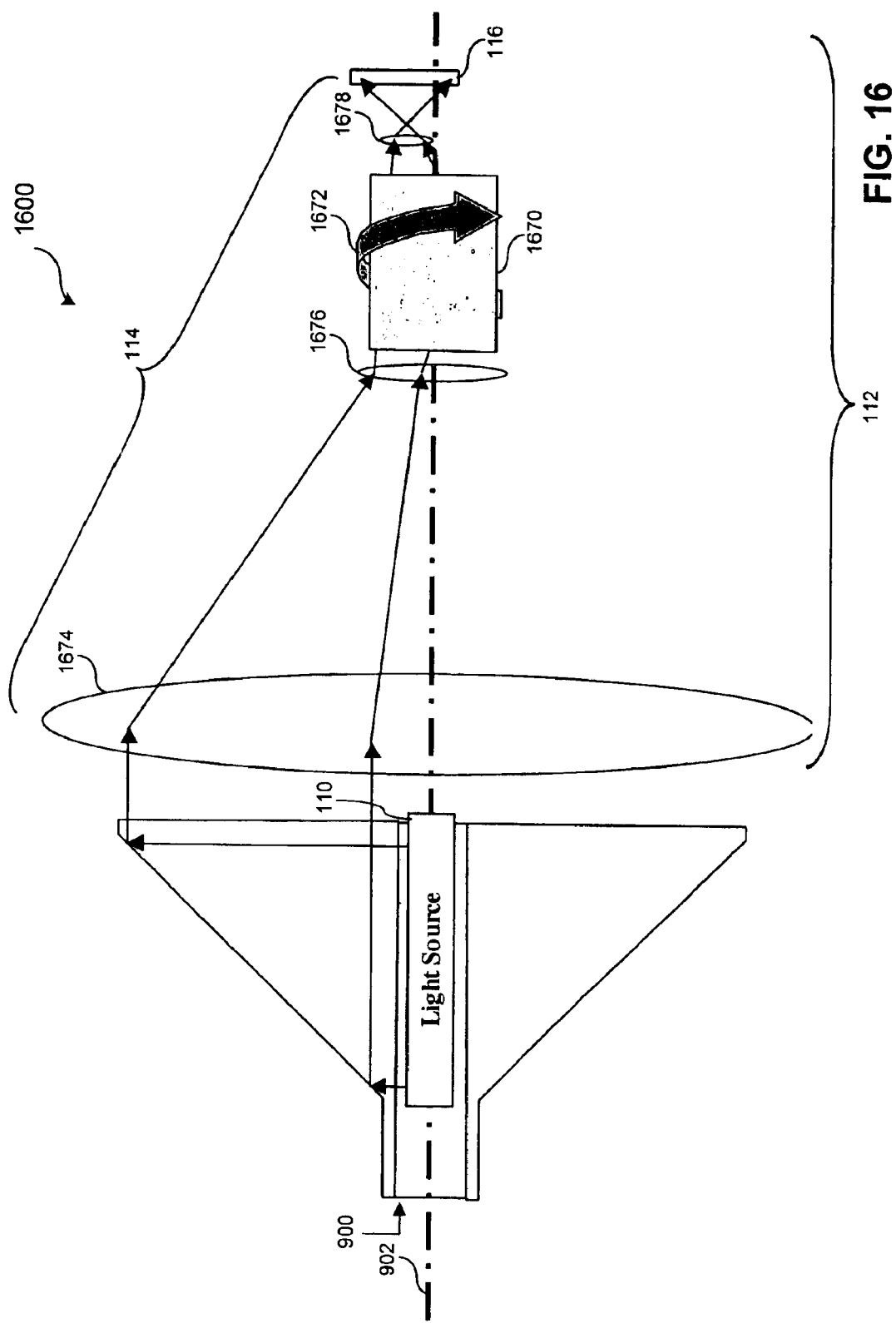
Figure 17:
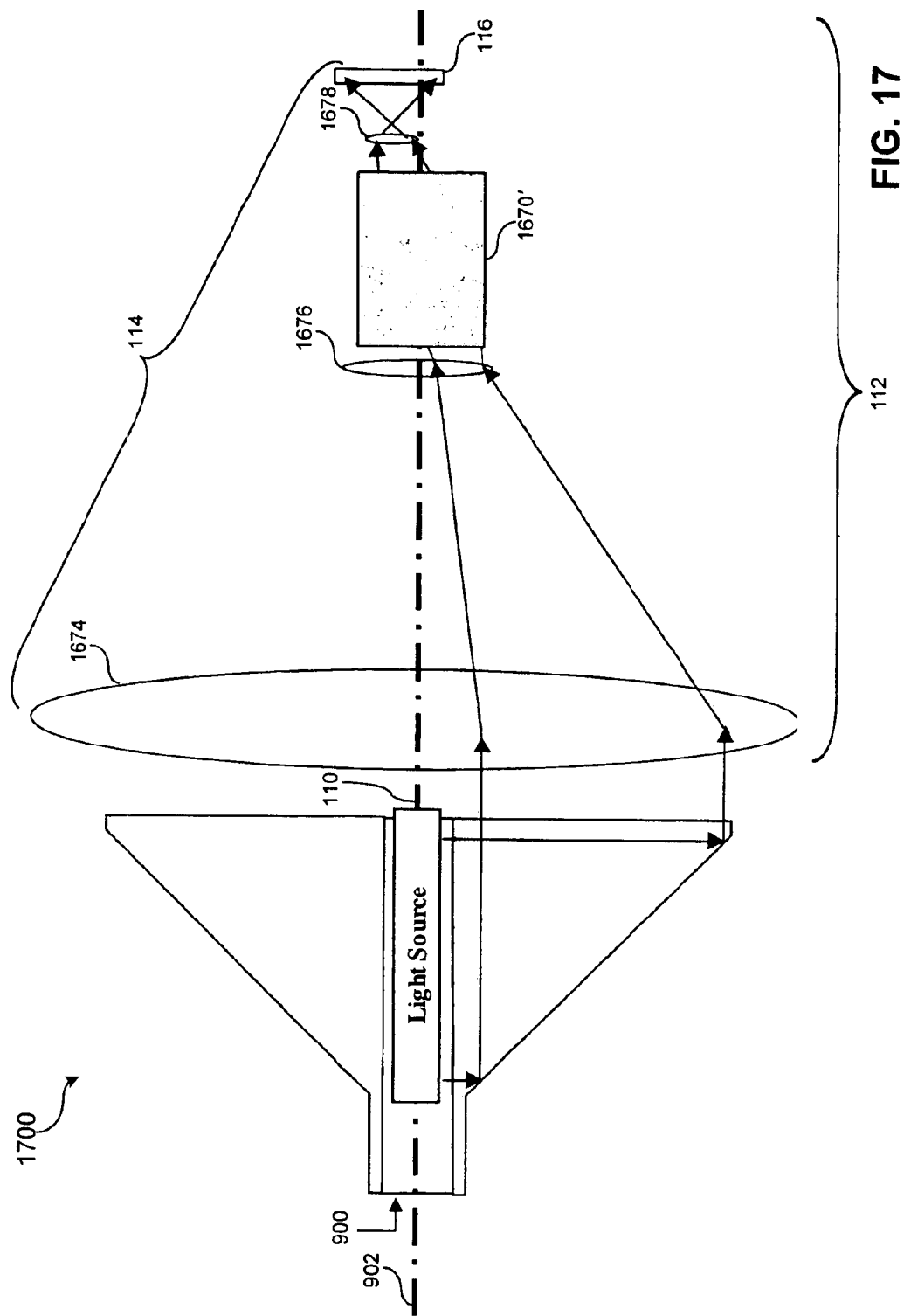

FIGS. 16–17 show various optical rotating devices that rotate an image captured at a prism according to various embodiments of the present invention.

Figure 18:
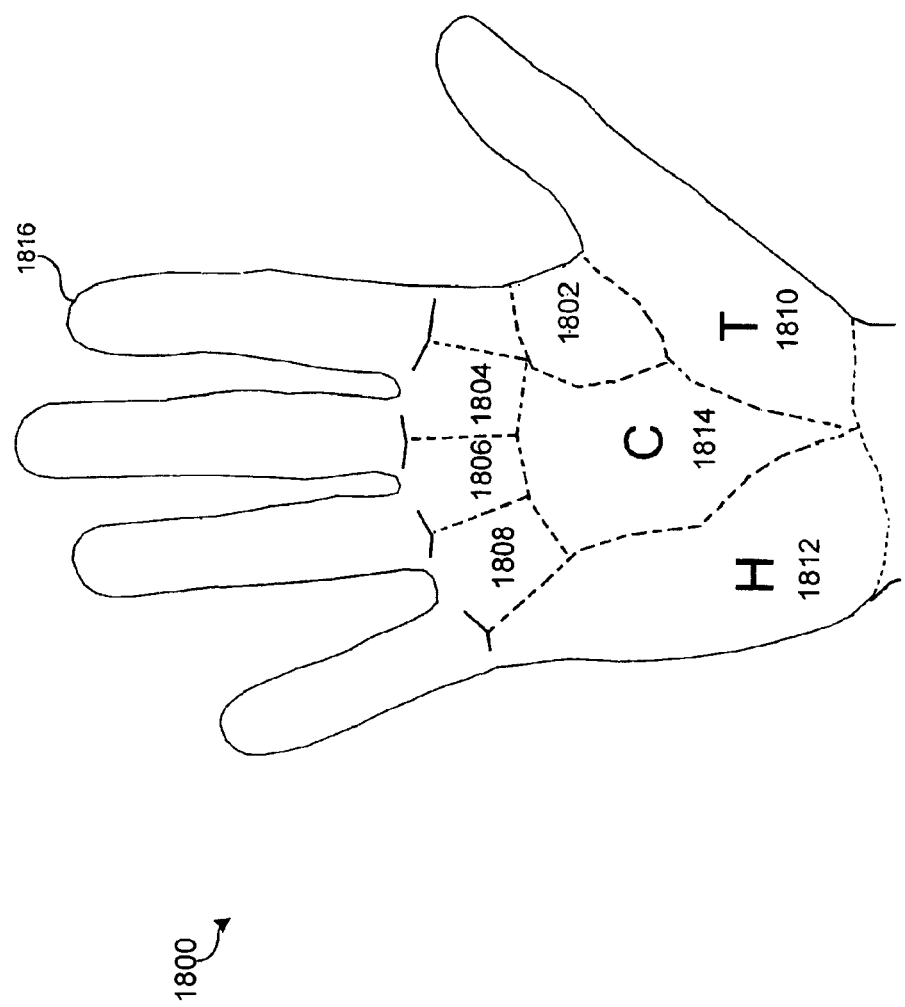
Figure 19:
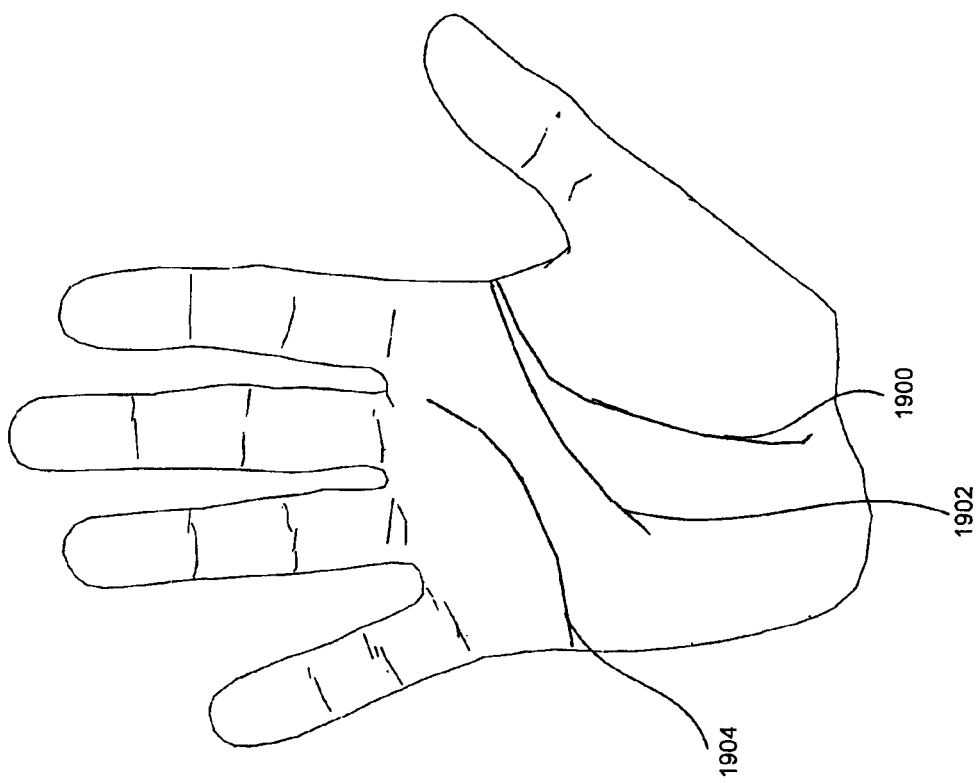
Figure 20:
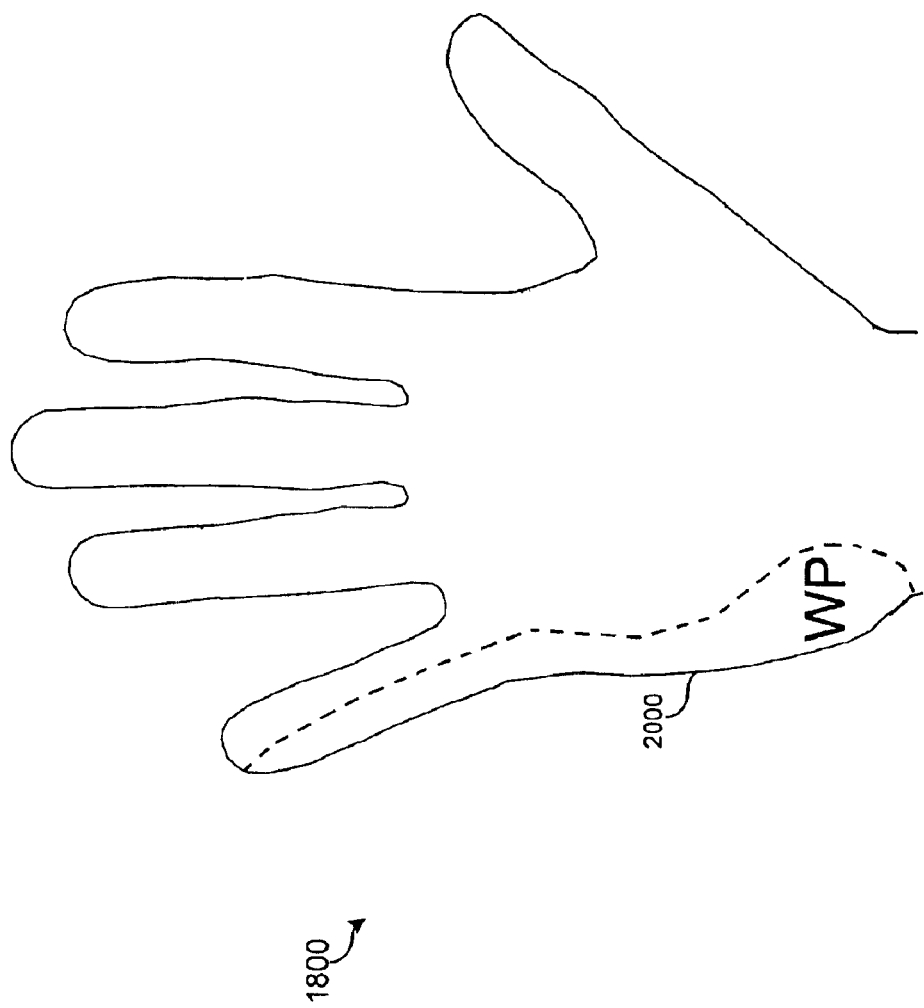

FIGS. 18–20 show various parts of a hand used during image and biometric analysis according to embodiments of the present invention.

Figure 21:

FIG. 21 shows an image of a print pattern of writer's palms and fingertips captured according to an embodiment of the present invention.

Figure 22:

FIG. 22 show an image of a print pattern of left and right hand prints taken during different scans captured according to an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Embodiments of the present invention provide rotating optical system that is used to detect light that has totally internally reflected from an inside surface of a non-planar prism to capture image data representing biometric data of a portion of a body of a user. The rotating optical system allows scanning of all or part of a hand print for one or more hands positioned on an outside curved surface of the non-planar prism using a detector having a surface area substantially smaller than a surface area of the inside surface of the non-planar prism. The curved surface or the non-planar prism can be symmetrical about an axis of symmetry of the optical element, and the rotating optical device can rotate about that axis. Typically, a print pattern on palm pocket, writer's palm, or the like, is hard to capture on a flat surface. In contrast, using the rotating optical system to capture image data from the non-planar prism of the present invention provides a form so that the print patterns or different parts of a hand (e.g., fingertips and a writers palm) are more easily captured using the non-planar prism. Hand and/or finger characteristic data can also be captured, for example hand geometry (e.g., finger lengths and spacing between fingers).

A measuring device can be rotated about a centerline axis of the optical element. During the rotation, a circular image of the full hand print (including thenar, hypothenar, inter digital, palm heel, palm pocket, and fingertips) and/or full palm and finger prints can be captured by the measuring portion.

The scanning imaging system can be rotated along an arcuate scan path about a centerline axis of the optical element. During the rotation, an image of the full hand print (including thenar, hypothenar, inter digital, palm heel, palm pocket, and fingertips) and/or full palm and finger prints can be captured by the measuring portion. This combination of a curved portion on the non-planar prism (e.g., a conical prism) and arcuate scan path provides a relative large platen surface area upon which to place a print pattern without requiring a correspondingly large area camera or set of cameras.

Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "print" can be any type of print including, but not limited to, a print of all or part of one or more fingers, palms, toes, foot, hand, etc. A print can also be a rolled print, a flat print, or a slap print.

The term "hand print," as used herein according to the present invention, can include any region on a hand having a print pattern, including thenar and hypothenar regions of the palm, interdigital regions, palm heel, palm pocket, writer's palm, and/or fingertips.

The term "biometric data" or "biometric information" throughout the specification can be data representative of a biometric, a digital or other image of a biometric (e.g., raw image data, a bitmap, binary, or other file), extracted digital or other information relating to the biometric (such as minutiae), etc.

The term "live scan" refers to a capture of any type of print image made by a print scanner. A platen can be movable or stationary depending upon the particular type of scanner and the type of print being captured by the scanner.

The terms "biometric imaging system," "scanner," "live scanner," "live print scanner," "fingerprint scanner," and "print scanner" are used interchangeably, and refer to any type of scanner which can obtain an image of a print pattern on all or part of one or more fingers, palms, toes, feet, hands, etc. in a live scan. The obtained images can be combined in any format including, but not limited to, an FBI, state, or international tenprint format.

The terms "finger characteristic information" and "hand characteristics information" are used to describe hand geometry information, such as finger and thumb lengths and spacing and minutiae extracted from print information.

The term "non-planar prism" includes a prism having a non-planar platen surface that extends around all or part of an axis of the prism, and whose non-planar platen surface allows for total internal reflection of light. A non-planar platen surface allows a print pattern (such as, a print pattern on a hand, a palm pocket, a writer's palm, a writer's palm with fingertips), or other hand characteristic images, to be captured. An example of this type of prism can be an approximately conically-shaped prism. Other examples can be approximately spherically shaped prisms, curved prisms, and the like.

Overall System

FIG. 1 shows a system 100 for capturing image data representing biometric data according to an embodiment of the present invention. System 100 includes a local section or unit 102 and a remote section or unit 104 (e.g., a computer, or the like) that can be coupled via a network 106. Network 106 can be any type of network or combination of networks known in the art, such as a packet-switched network with wired or wireless links, an intranet, the Internet, an Ethernet, or the like. Example links are links having a FIREWIRE or USB network interface. The remote section 104 may be in a same area as the local section 102, such that local and remote refer to an approximate distance they are relative to a final processing device of the image data (e.g., print or hand characteristic data).

Local section 102 includes a non-planar prism 108, having a non-planar (e.g., curved) surface that is symmetrical about an axis of symmetry of the prism, positioned between a light source 110 and a scanning imaging system 112. Scanning imaging system 112 can include a rotating imaging system 114 and a detecting system 116 (e.g., a camera). Scanning imaging system 112 captures image data from parts of a hand (not shown) interacting with non-planar prism 108. The image data is processed in processing and control system 118, which can generate one or both of an output signal and a communications signal, which can include the image data. The output signal can be transmitted to an optional output device 120, while the communications signal can be transmitted to input/output (I/O) device 122. The I/O device 122 then sends the output signal to remote section 104 over network(s) 106.

Remote section 104 includes an I/O device 124, a processing system 126, and optionally an output device 128. Processing system 126 can be used to process the image data to generate the biometric data. For example, extraction and matching operations can be performed on the image data. Once completed, results can be displayed or audibly indicated using output device 128. It is to be appreciated that other processes known in the biometric arts can also be performed in remote section 104. All of these additional processes are contemplated within the scope of the present invention.

It is to be appreciated that network 106 and/or remote device 104 can be coupled to other peripheral devices and/or networks, which is contemplated within the scope of the present invention.

FIG. 2 shows local section 102 of system 100 according to an embodiment of the present invention. Rotating imaging system 114 can include a motor 200, belt 202, and pulley 204 that rotates rotating stage 206, optical enclosure 208, and detecting system 116 around an axis of symmetry of non-planar prism 108. During rotation, positioning of rotating imaging system 114 can be monitored by controller 118 using signals from stop position sensor 210, home position sensor 212, and/or encoder system 214. In this example, encoder system 214 is an optical position encoder receiving light on sensor 216 after the light interacts with strip 218.

Although certain dimensions and/or types of devices are shown in this figure, these are not meant to be limiting, only exemplary. It is to be appreciated that different sizes or types of elements can be used within the scope of the present invention.

It is to be appreciated that, although not shown, various other types of devices can be used to rotate rotating imaging system 114. For example, an electromagnetic device (e.g., stepper motor), a resilient device, or any other device known to one or ordinary skill in the art are all contemplated within the scope of the present invention. Thus, a motor/belt/pulley system is shown merely as one exemplary way to rotate rotating optical system 114.

Figure 3:
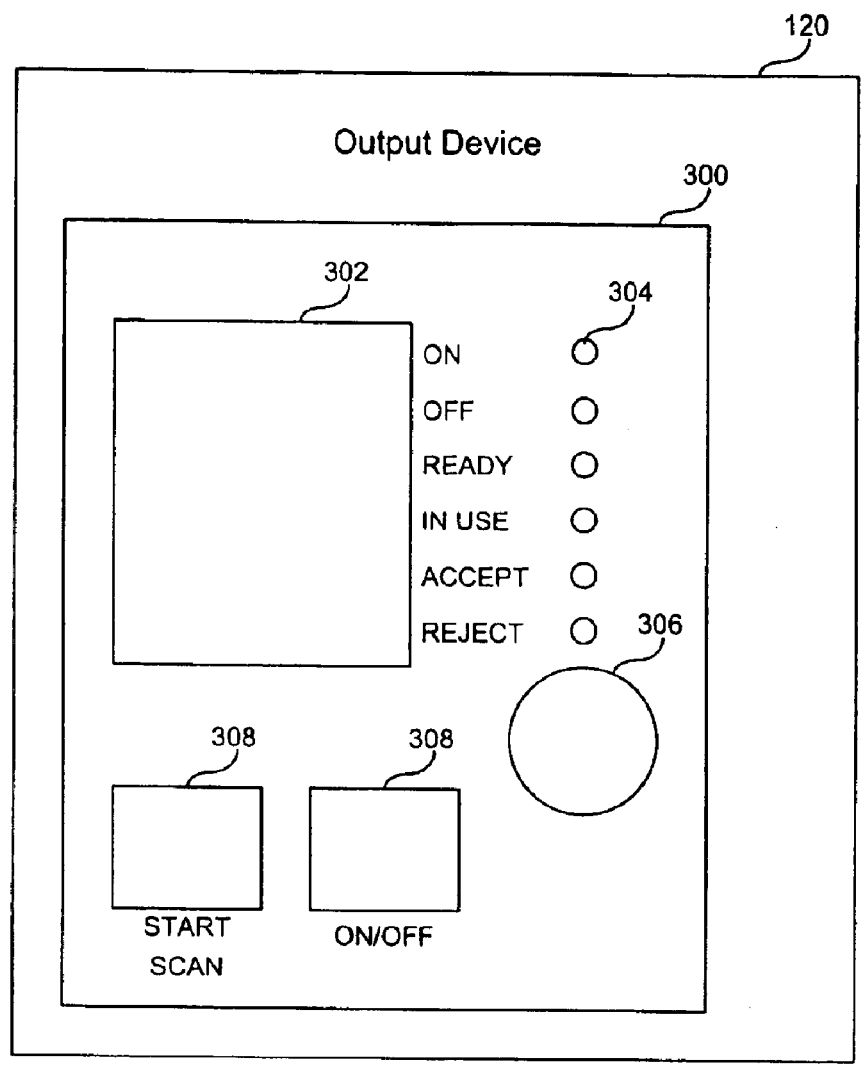
FIG. 3 shows an indicator section of the system in FIGS. 1 and 2 according to an embodiment of the present invention.

FIG. 3 shows a portion 300 of output device 120 according to an embodiment of the present invention. Portion 300 can include one or more of the following indicators: a display 302 (e.g., an LCD display), a plurality of visual indicators 304 (e.g., LEDs), and/or audio device 306. Portion 300 can also include input devices 308.

For example, depending on the functionality provided in local system 102, display 302 can output results from an image quality capture routine or an extract and match procedure performed using processing system 126 (e.g., a good scan, an identity of an individual scanned, etc.). Display 302 can also be used to give instructions to an operator as to what needs to done prior to, during, and subsequent to the scanning. Display 302 can further be used to indicate status of the scanning and whether it was successfully completed or not. In another example, display 302 can be a touch panel display that allows an operator to enter information into system 100 or control system 100 using a control device on the display.

LEDs 304, as shown in this example, can provide information about system 100 being ON, OFF, READY, or IN USE. LEDs 304 can also provide information regarding a quality of the scan, for example whether the images obtained are acceptable or rejected.

Audio device 306 can give audio indications of the status of system 100 shown through LEDs 304. Audio device 306 can also be used to provide pre-stored instructions for an operator, that might be in response to a status of system 100 or a quality of the scanned image.

Input devices 308 can be buttons, mechanical interfaces, electronic interfaces, etc. that can be used to control system 100 and or a scanning operation (e.g., an ON/OFF button, a start scan button, or the like).

FIGS. 4, 5, 6, and 7 show zoomed in views of portions of encoder section 214 according to various embodiments of the present invention. Any type of position encoder can be used including, but not limited to, optical, magnetic, or mechanized position encoders with incremental or absolute position encoding.

Figure 4:
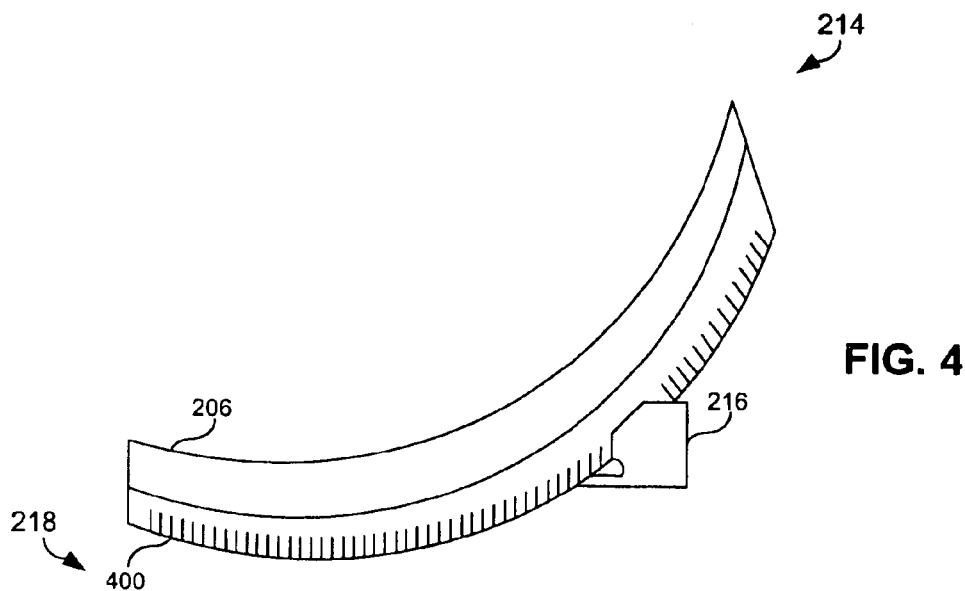

FIG. 4 shows an encoder strip 218 having an incremental encoder scale 400 that is coupled to rotating stage 206.

Figure 5:
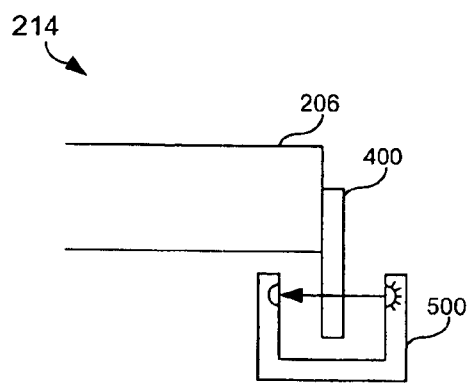

FIG. 5 shows a transmission type optical encoder 500. Light passes through scale 400 of encoder strip 218 to be detected by encoder 500 while stage 206 is rotating.

Figure 6:
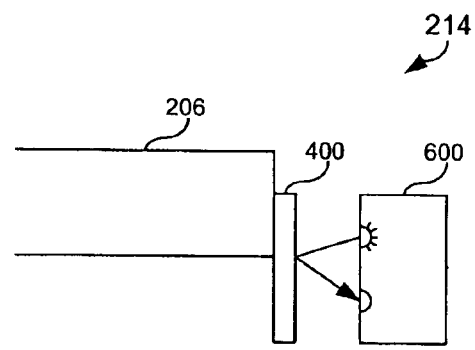

FIG. 6 shows a reflection type optical encoder 600. Light reflects from scale 400 of strip 218 to be detected by encoder 600 while stage 206 is rotating.

Figure 7:
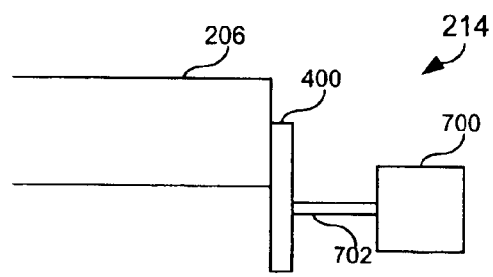

FIG. 7 shows a mechanical encoder 700. An extension 702 (e.g., rod or shaft) interacts with scale 400 of strip 218. This interaction can be monitored by encoder 700.

FIG. 8 shows an optical system 208 (e.g., one or more optical elements, lenses, etc.) that can be used to direct an image from prism 108 onto detecting system 116 according to an embodiment of the present invention.

In one embodiment, optical system 208 can include a large optical device (e.g., a lens) that is large enough to direct light from an entire bottom are of prism 108 (e.g., surface 912 shown in FIG. 9 below) onto detecting system 116. In this embodiment, detecting system 116 can be a relatively large area scanner that looks an entire bottom area of non-planar prism 108. This is in contrast to having a rotating optical device (e.g., 1670 or 1670' shown in FIGS. 16–17) that is used to scan light totally internally reflected from surface 916 (FIG. 9) that exits prism 108 through surface 912 (FIG. 9) onto detecting system 116.

In some embodiments process and control system 118 can receive inputs from stop position sensor 210, home position sensor 212, a heater coupled to non-planar prism 108, I/O device 122, and other devices that may be associated with system 100. These inputs can be used to generate various output control signals, for controlling I/O device 122, scanning imaging system 112, and/or other devices that may be associated with system 100. I/O devices 122 and 124 can be FIREWIRE or USB transceivers, or other types of devices as are known in the relevant arts.

Non-Planar Prism

FIG. 9 shows a cross-sectional view of non-planar prism 108 according to one embodiment of the present invention. Non-planar prism 108 has an opening 900 running along an axis of symmetry 902. Opening 900 is defined within an area 904 of non-planar prism 108 that has a non-planar first section 910 and a substantially planar second section 912. A top portion of non-planar prism 108 can contain a guide or positioning device 914, which is used to properly place a subject's hand (not shown) during biometric image capture.

Non-planar prism 108 can be manufactured from transparent, translucent, and/or colored acrylic, glass, plastic, or the like, and may be coated with various protective coatings, as is known in the relevant arts. If the non-planar prism material is colored, it can be of a color that matches a color of light for a light source being used. A first surface 906 of first section 910 is shaped so as to provide the non-planar aspect to prism 108. As discussed above, the non-planar shape is preferably approximately conical, but can also be curved, spherical, or the like, so long as a second surface 916 provides total internal reflection of incident light.

Platen surface 906 is a surface upon which an object (e.g., hand(s)) having a print is placed. Platen surface 906 can be a surface of non-planar prism 108 or another surface in optical contact with an outside surface of prism 108. For example, platen surface 906 can be a surface of an optical protective layer (e.g., silicone pad) placed on prism 108 at section 910.

In operation, the subject's hand is positioned using positioning device 914 and light enters non-planar prism 108 either from within opening 900 or an edge 918 opening 900. The light totally internally reflects from second surface 916, and out second section 912 onto a detector 116 (see FIG. 8).

Through use of the shape shown for non-planar prism 108, substantially all or part of a hand (e.g., thenar and/or hypothenar region of the palm, the "writer's palm," inter digital regions, palm heel, palm pocket, and/or fingertips) can be captured in one or more scans. This is partially because surface area 910 is sized to receive one or more hands wrapped around non-planar prism 108 generally along a direction of a curve. Accordingly, in embodiments, images with features of up to two hands of a subject can be captured in a single scan.

Other exemplary non-planar prisms can be found in U.S. Ser. No. 10/725,539, entitled "A Non-Planar Prism Used In A System For Obtaining Print And Other Hand Characteristic Information," filed Dec. 3, 2003, which is incorporated by reference herein in its entirety.

FIGS. 10–11, as discussed in more detail below, illustrate how a subject places one 1000 or both 1100 hands on non-planar prism 108. As can be seen, positioning device 914 in used is either case to properly align the hand 1000 or hands 1100 on non-planar prism 108 for image capture.

Rotating Optical System

Different embodiments of rotating optical systems according to the present invention are now described with respect to FIGS. 12–14 and 16–17.

FIG. 12 shows a section 1200 of system 100 according to an embodiment of the present invention. Scanning imaging system 112 can rotate about axis 902 (e.g., axis of rotation) to pick up images from surface 906. In the example shown in FIG. 12, a print pattern of a palm 1260 and fingers 1262 is scanned. It is to be appreciated that a thumb (not shown) can also be scanned, which is not shown in this perspective of section 1200. In this embodiment, light source 110 is positioned in opening 900 of non-planar prism 108.

Positioning device 914 can be used to position palm 1260 and fingers 1262, a single hand on one side of positioning device 914, or two hands with one on each side of positioning device 914. In another embodiment, a writer's palm and/or a writer's palm and fingertips can be imaged.

A hand is placed so that (based on the perspective of the figure) the thumb is on a left side of device 914 and fingers 1262 are on a right side of device 914. It is to be appreciated that in some examples two hands can be placed on non-planar prism 108, during which device 914 is used to separate the two hands. During operation, scanning device 112 may take about 3 seconds to about 10 seconds to fully scan all areas of non-planar prism 108. A dots per inch (dpi) resolution specified for the captured biometric image is used to determine a proper scanning speed. In examples, dpi resolution of approximately 500–1000 dpi is obtained. Higher resolution is generally obtained near a top of surface 906 than the base since a rotating line camera captures more overlapping samples of a scanned camera.

FIG. 13 shows a section 1300 of system 100 according to an embodiment of the present invention. Section 1300 is similar to section 1200, except light source 110 illuminates opening edge 918 (e.g., possibly a chamfered or angled edge) of an outer circumference of non-planar prism 108. Surface 1380 of opening 900 can be opaque with respect to light beams from light source 110. The opaqueness can be based on coating surface 1380 with a black or dark material 1382, or from using other known ways of making a surface opaque. Making surface 1380 opaque substantially reduces the effects of stray or ambient light and allows for excellent contrast that detecting system 116 can easily distinguish between total internal reflection and other light.

FIG. 14 shows a section 1400 of system 100 according to an embodiment of the present invention. Section 1400 is similar to sections 1200 and 1300, except light source 110 illuminates edge 1490 (e.g., a chamfered or angled edge) of non-planar prism 108, and surface 1480 of opening 900 can be coated with a white, possibly reflective, material 1492, or from using other known way of making a surface white, light, and/or reflective. Making surface 1480 white substantially reduces the effects of stray or ambient light and allows for excellent contrast detecting system 116 can easily distinguish between total internal reflection and other light.

FIG. 15 shows an actual captured pixel layout 1500 for the biometric image data according to an embodiment of the present invention. Based on reflection angle of light from light source 110 off second surface 916, detecting system 116 can pick up pixel images as shown in layout 1500.

Basically, a varying outside diameter of non-planar prism 108 can lead to spreading or overlap of captured image data. This can be based on a rotation amount per scan for different areas of non-planar prism 108.

FIGS. 16–17 show a section 1600 of system 100 according to an embodiment of the present invention. Section 1600 scans by rotating an optical component 1670 (e.g., a dove non-planar prism, Pachan non-planar prism, or any other image rotator) around axis 902 (e.g., an axis of rotation).

As seen in FIG. 16, in a first example, the rotation of optical component 1670 occurs in the direction of arrow 1672. As seen in FIG. 17, in a second example, light passing through rotating optical component 1670' is rotated internally within optical component 1670', without the optical component 1670 rotating, and onto detecting system 116.

With continuing reference to FIGS. 16 and 17, section 1600 also includes an optical element 1674 positioned adjacent non-planar prism 108 that directs received light onto an optical element 1676 positioned adjacent rotating optical component 1670. Light leaving rotating optical component 1670 is directed onto detecting system 116 using optic 1678.

It is to be appreciated given this description that various other arrangements of optical elements (e.g., lenses, mirrors, etc.) can also be used to direct light from non-planar prism 108 to detecting system 116 during scanning of scanning optical system 112. These various other arrangements are contemplated within the scope of the present invention.

It is to be appreciated that a speed scanning optical system 112 can be used so that images have a resolution of about 500 dots per inch to about 1000 dots per inch, or other possible ranges as is known in the art.

Captured Hand Sections

FIGS. 18–22 show examples of various aspects of a hand or palm that can be imaged in order to generate biometric information or data. These are merely exemplary areas of a hand or palm. Other areas can be images, as would be obvious to a person skilled in the art given this description. These examples are not meant to limit the invention.

FIG. 18 shows sections 1802–1814 of a palm 1800 of a hand 1816 that can be imaged, according to embodiments of the present invention. Section 1802 is a first interdigital area. Section 1804 is a second interdigital area. Section 1806 is a third interdigital area. Section 1808 is a fourth interdigital area. Section 1810 is a thenar area. Section 1812 is a hypothenar area. Section 1814 is a central area or palm pocket.

FIG. 19 shows creases 1900–1904 of palm 1800 that can be included in an image, according to embodiments of the present invention. Crease 1900 is a thenar crease. Crease 1902 is a proximal transverse crease. Crease 1904 is a distal transverse crease.

FIG. 20 shows a writer's palm or writer's palm hypothenar area 2000 of palm 1800. Writer's Palm 2000 includes a print pattern (ridges and valleys) that extends from palm hypothenar area 1812 up along a side of the hand.

FIG. 21 shows images 2100 of right (R) and left (L) hand writer's palms 2000 and fingertips 2102, according to an embodiment of the present invention.

According to a feature of the present invention, writer's palm 2000 and fingertips 2102 can be captured in a single scan because of the shape of non-planar prism 108. Unlike conventional planar platen surfaces, writer's palm 2000 and fingertips 2102 can be placed on a non-planar prism 108 at the same time during a live scan without requiring any difficult or awkward contortions of a persons hand.

FIG. 22 shows images 2200 of right and left hand prints captured during two scans of scanner 112 according to an embodiment of the present invention.

Examples of image capture methods can be found in U.S. Ser. Nos. 10/725,542, entitled "Biometric System For Capturing Print Information Using A Coordinate Conversion Method," 10/725,540, entitled "Methods For Obtaining Print And Other Hand Characteristic Information Using A Non-Planar Prism," and 10/725,541 entitled "System And Method For Generating A Preview Display In A Print Capturing System Using A Non-Planar Prism", all filed Dec. 3, 2003, and which are all incorporated herein by reference in their entireties.

As described above, the non-planar surface of the non-planar prism allows for a pocket of a palm of hand to make contact with a platen and break a surface total internal reflection of the non-planar prism. This creates a mechanism for capturing a high contrast round palm print image. According to further embodiments, a print image can also be captured that includes both a palm print and one or more fingerprints on a same hand. In this way, other biometric information can be extracted from the print images, such as, the association of the palm and fingerprints as belonging to the same hand, distance information on the distance from palm locations to finger locations, etc. According to still further embodiments, both a hand print and target/calibration information can be captured at a same time and stored together.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A scanning optical device used in a system configured to capture image data representing biometric data, comprising:

an optical device;

means for rotating; and a detection device, wherein the optical device directs light that has totally internally reflected from an inside surface of a non-planar prism in the system onto the detection device, while the rotating means rotates at least one of the optical device and the detecting device during detection of the light, and wherein the image data of a print surface of up to substantially all of a person's hand is captured while the hand is stationary on the optical device.

2. The scanning optical device of claim 1, wherein the rotating means rotates at least one of the optical device and the detecting device around an axis of symmetry of the non-planar prism to scan an entire surface area of the inside surface of the non-planar prism.

3. The scanning optical device of claim 1, wherein the rotating means comprises:

a motor; and a belt and pulley system coupled to the optical device and the detection device, wherein when the motor operates the belt and pulley system is configured to rotate the imaging optics and the detection device about an axis of symmetry of the non-planar prism to scan an entire surface area of the inside surface of the non-planar prism.

4. The scanning optical device of claim 3, wherein the rotating optical element includes a dove prism.

5. The scanning optical device of claim 3, wherein the rotating optical element includes a Pachan prism.

6. The scanning optical device of claim 1, wherein the rotating means comprises:

a rotating optical element coupled to a motor, such that the rotating optical element rotates about an axis of symmetry of the system.

7. The scanning optical device of claim 1, wherein the rotating means is configured to generate images having a resolution of about 1000 dots per inch.

8. The scanning optical device of claim 1, wherein the rotating means is configured to generate images having a resolution of about 500 dots per inch to about 1000 dots per inch.

9. The scanning optical device of claim 1, wherein the rotating means is configured to generate images having a resolution of about 500 dots per inch.

10. The scanning optical device of claim 1, wherein the rotating means comprises one of a belt and pulley system, a electromagnetic system, a resilient device system, or a stepper motor.

11. The scanning optical device of claim 1, wherein the rotating means moves along an arcuate path to capture radial scan line images transmitted through a base of the non-planar prism.

12. A system including a scanning optical device, the scanning optical device comprising:

a directing device;

means for rotating; and a detection device, wherein the directing device directs light that has totally internally reflected from an inside surface of a conical prism in the system onto the detection device, while the rotating means rotates at least one of the directing device and the detecting device during detection of the light.

13. A scanning optical device used in a system that captures up to substantially all of a print surface of a hand while the hand remains stationary, comprising:

a directing device;

rotating device; and a detection device, wherein the directing device directs light that has totally internally reflected from an inside surface of a non-planar prism in the system onto the detection device, while the rotating device rotates at least one of the directing device and the detecting device during detection of the light.

14. The scanning optical device of claim 13, wherein a contact surface of the non-planar prism is shaped to allow the capturing of the up to substantially all of the print surface of the hand, while the hand remains stationary on the non-planar prism.

* * * * *